(No Model.) 2 Sheets—Sheet 1.

D. C. CONKLIN & J. HUGHES.
BAGGAGE LOADER.

No. 571,828. Patented Nov. 24, 1896.

Witnesses:
F. G. Fischer
[signature]

Inventors:
D. C. Conklin and J. Hughes
By Higdon & Higdon
Attys.

(No Model.) 2 Sheets—Sheet 2.

D. C. CONKLIN & J. HUGHES.
BAGGAGE LOADER.

No. 571,828. Patented Nov. 24, 1896.

Witnesses:
F. G. Fischer
G. Y. Thorpe

Inventors:
D. C. Conklin and J. Hughes
By Higdon & Higdon
Attys.

UNITED STATES PATENT OFFICE.

DON C. CONKLIN AND JOHN HUGHES, OF CORDER, MISSOURI.

BAGGAGE-LOADER.

SPECIFICATION forming part of Letters Patent No. 571,828, dated November 24, 1896.

Application filed May 11, 1896. Serial No. 590,977. (No model.)

*To all whom it may concern:*

Be it known that we, DON C. CONKLIN and JOHN HUGHES, of Corder, Lafayette county, Missouri, have invented certain new and useful Improvements in Baggage-Loaders, of which the following is a full, clear, and exact description, reference being had to the accompanying drawings, forming a part thereof.

Our invention relates to baggage-loaders, and our object is to produce a device of this character, either stationary or portable, whereby trunks and other heavy baggage may be loaded quickly and easily into a car or baggage-wagon.

With this object in view the invention consists in certain novel and peculiar features of construction and combinations of parts, as will be hereinafter described and claimed.

In order that the invention may be fully understood, we will proceed to describe it with reference to the accompanying drawings, in which—

Figure 1:
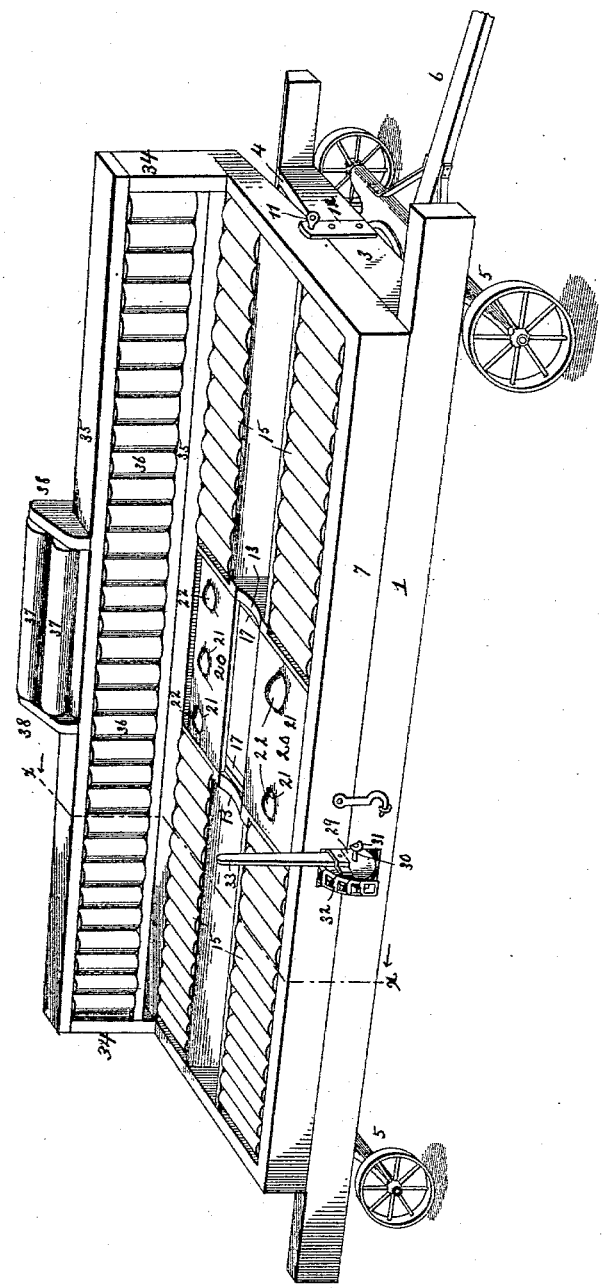
Figure 3:
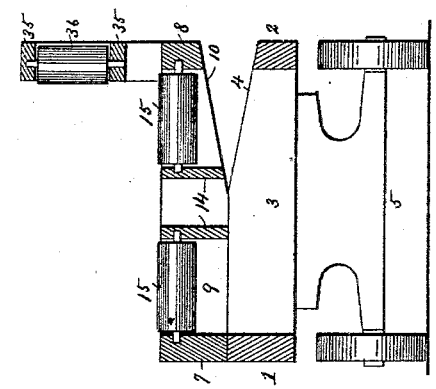
Figure 2:
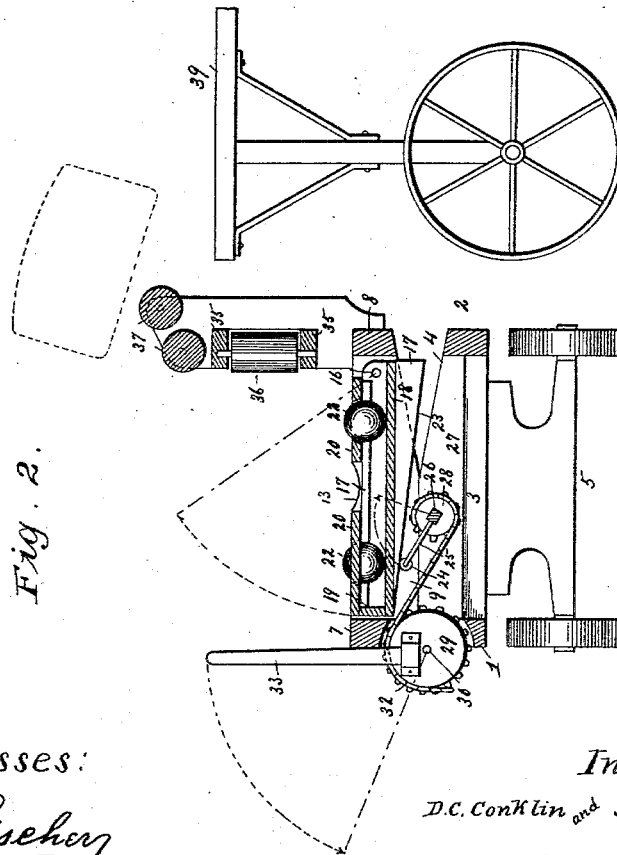

Figure 1 represents a perspective view of a portable baggage-loader embodying our invention. Fig. 2 represents a cross-section of the same, taken through its middle, and also represents the rear end of a baggage wagon or truck arranged in proper position to receive a trunk from the loader. Fig. 3 represents a cross-section taken on the line $x\,x$ of Fig. 1.

Like numerals refer to corresponding parts throughout the several views.

In the said drawings, 1 designates the front bar, 2 the rear bar, and 3 the end bars, of a stationary frame forming the body portion of our loader, and said end bars are beveled or sloped downwardly from their middle points to their rear ends, as shown at 4, the rear bar 2 corresponding in height to the rear ends of said end bars. This frame may be stationary and supported in any suitable or preferred manner, but preferably is mounted upon wheeled trucks 5, from one of which extends the tongue or handle 6, by which it may be drawn from place to place.

7 designates a front bar, 8 the rear bar, and 9 the end bars, of a frame similar in all respects to the one above described, except that the beveled surfaces 10 of the end bars, which correspond to the beveled surfaces 4, extend upwardly from the middle of said end bars between the outer ends, so as to form substantially a V-shaped space between the bars 3 and 9, which are superposed relative to each other, the unbeveled portions of the end bars and the front bars resting squarely against each other, as shown clearly in the drawings. Said frames are pivotally connected together by means of pins 11, extending through the vertical plates 12, projecting upwardly from the end bars 3 and embracing loosely the opposite ends of the upper frame, as shown clearly in Fig. 1. Only one of said plates 12 and pins 11, however, appear in the drawings, the duplicate of each being hid at the opposite end of the frames. The upper or pivoted frame, at opposite sides of its center and at a suitable distance apart, is provided with parallel transverse partitions 13 of about the same configuration and with two longitudinal partitions 14, which extend parallel with the bars 1 and 2, and journaled between the front and rear bars and the longitudinal partitions of the rear frame are four series of transversely-extending antifriction-rollers 15, two series being near the front bar and two series near the rear bar.

Pivotally mounted at 16 between the partitions 13 near their rear ends is a swinging frame comprising parallel bars 17, a base-plate 18, a front bar 19, and a pair of top plates 20, provided with circular openings 21, and resting loosely within said frame and projecting upwardly through said circular openings are antifriction-rollers 22. The lower edges of the bars 17 of said frame are preferably beveled or inclined downwardly, as shown at 23, and bearing against the same near the front end of the frame is an antifriction-roller 24, journaled at the outer end of an arm 25, projecting normally forwardly and upwardly from a short shaft 26, which shaft is preferably journaled in cross-bars 27 of the stationary frame. 28 designates a small sprocket-wheel mounted rigidly upon said shaft. 29 designates a much larger sprocket-wheel having its shaft 30 journaled in the bearing 31, projecting forwardly from the bar 1 of the stationary frame or body portion, and 32 designates a sprocket-chain which is secured at its opposite ends permanently to said sprocket-wheels and extending forwardly from the lower side of the sprocket-wheel 28 to the upper side of the sprocket-wheel 29. In order to operate said sprocket-wheels and thereby throw the pivoted ball-carrying frame to the position indicated in dotted lines in Fig. 2, a lever 33 is secured rigidly at its lower end to the sprocket-wheel 29. By throwing said lever downwardly it is obvious that the arm 25 of the shaft 26 will assume the position indicated by its respective arrow, and consequently, by causing the antifriction-roller 24 to travel along the inclined faces or edges 23 of said ball-carrying frame, throw the latter quickly and easily, because of the great leverage obtained, to the position shown in dotted lines hereinbefore referred to, and by permitting said lever to resume its original position it is obvious that said frame will also assume its normal or horizontal position.

The pivoted frame is provided at its rear end with an upwardly-projecting extension consisting of the end bars 34 and the parallel horizontal bars 35, between which latter are rotatably mounted a series of vertically-arranged antifriction-rollers 36, and above the top bar are a pair of longitudinally-extending horizontal antifriction-rollers 37, which are journaled at their opposite ends in upwardly-projecting brackets 38, which brackets preferably extend downwardly in rear of the bars 35 and are secured at their lower ends to the bar 8 of said pivoted frame.

In practical operation to load a trunk upon a car or wagon the latter is backed up against the baggage-loader and opposite the antifriction-rollers 37, as shown clearly at 39. The trunk is then placed on the pivoted frame and given a shove or pull, which transfers it easily and quickly, owing to the little frictional resistance it receives from the various series of rollers, upon the ball-carrying swinging frame at the middle of the loader. As soon as it assumes this position the baggageman or other person grasps the lever 33 and pulls the same quickly downward, and consequently throws the said frame up to the position indicated by dotted lines, which therefore tosses the trunk over or upon the antifriction-rollers 37 with sufficient force or momentum to carry it upon the wagon 39. In order to make this operation more positive and reliable, however, we preferably tilt, or the weight of the trunk tilts, the upper frame upon its pivots 11 and causes it to move until the beveled edges 10 of the end bars 9 rest upon the beveled edges 4, which consequently throws the series of antifriction-rollers 36 at a corresponding angle to the vertical. When in this position, it is obvious that the operation of the ball-carrying swinging frame will invariably toss the trunk or other baggage within the car or other vehicle placed to receive it.

From the above description it is obvious that we have produced a baggage-loader which is positive and reliable in operation and which will be found useful and convenient in many positions not mentioned herein, but to which it will be found applicable.

It is to be understood, of course, that slight changes in the form, proportion, or detail construction of the parts or the substitution of equivalents will not constitute a departure from the spirit and scope of our invention.

Having thus described the invention, what we claim as new, and desire to secure by Letters Patent, is—

1. A baggage-loader, comprising a body portion, a frame mounted thereon and provided with one or more series of antifriction-rollers, a swinging frame pivoted in said antifriction-roller-carrying frame, and means to operate the same, substantially as described.

2. A baggage-loader, comprising a body portion, a frame mounted thereon, and provided with an upward extension at its rear edge, antifriction-rollers mounted in the horizontal portion of said frame and also in said upward extension, a swinging frame mounted in said antifriction-roller-carrying frame, and means to operate the same, substantially as described.

3. A baggage-loader, comprising a body portion, a frame mounted thereon and provided with an upward extension at its rear edge, antifriction-rollers mounted in said upward extension, a swinging frame mounted in said antifriction-roller-carrying frame, a rock-shaft journaled in the body portion and provided with an arm engaging the under side of said swinging frame, and means to operate the said rock-shaft, substantially as described.

4. A baggage-loader, comprising a body portion, a frame mounted thereon, and provided with an upward extension at its rear edge, antifriction-rollers mounted in the horizontal portion of said frame and also in said upward extension, a swinging frame mounted in said antifriction-roller-carrying frame, a rock-shaft journaled in the body portion, provided with an arm engaging the under side of the swinging frame, a sprocket-wheel upon the body portion, a chain secured to said sprocket-wheels and extending upwardly from the first-named to the last-named sprocket-wheel, and means to operate said last-named sprocket-wheel and thereby elevate said swinging frame, substantially as described.

5. A baggage-loader, comprising a body portion, a frame mounted thereon and provided with an upward extension at its rear edge, antifriction-rollers mounted in the horizontal portion of said frame and also in said frame extension, a swinging frame mounted in said antifriction-roller-carrying frame, a rock-shaft journaled in the body portion, provided with an arm engaging the under side of the swinging frame, a sprocket-wheel mounted on said shaft, a sprocket-wheel mounted upon the body portion, a chain secured to said sprocket-wheels and extending upwardly from the first-named to the last-named sprocket-wheel, and a lever secured at its lower end rigidly relative to said last-named sprocket-wheel, substantially as and for the purpose set forth.

6. A baggage-loader, comprising a body portion beveled outwardly and rearwardly at its upper side, a frame pivotally mounted thereon and beveled upwardly and rearwardly at its under side, an upward extension at the rear edge of said frame, antifriction-rollers journaled in the horizontal portion of said frame, vertically-arranged antifriction-rollers also journaled in said extension above the vertical series of rollers, a swinging frame mounted in said antifriction-roller-carrying frame and provided with antifriction-balls, and means to swing said frame and discharge the baggage upon it, substantially as described.

In testimony whereof we affix our signatures in presence of two witnesses.

DON C. CONKLIN.
JOHN HUGHES.

Witnesses:
JESSE LEWIS,
NEAL LEWIS.